United States Patent [19]
Mattes

[11] Patent Number: 5,469,578
[45] Date of Patent: Nov. 28, 1995

[54] NIGHT VISION GOGGLE HEADGEAR MOUNT

[75] Inventor: Paul B. Mattes, Garland, Tex.

[73] Assignee: Varo, Inc., Garland, Tex.

[21] Appl. No.: 58,955

[22] Filed: May 7, 1993

[51] Int. Cl.⁶ .................... A42B 1/24; A61F 9/02
[52] U.S. Cl. ........................................ 2/6.7
[58] Field of Search ................ 2/6.2, 6.7, 422, 2/424, 453, 10, 6.3; 359/409, 815; 250/214 VT

[56] References Cited

U.S. PATENT DOCUMENTS

| | | | |
|---|---|---|---|
| 3,971,933 | 7/1976 | Adamson, Jr. | 250/213 |
| 4,449,787 | 5/1984 | Burbo et al. | 350/538 |
| 4,463,252 | 7/1984 | Brennan et al. | 250/213 |
| 4,592,096 | 6/1986 | Glasheen | 2/427 |
| 4,670,912 | 6/1987 | Hart | 2/422 X |
| 4,672,194 | 6/1987 | Kastendieck et al. | 250/214 VT |
| 4,741,054 | 5/1988 | Mattes | 2/422 X |
| 4,901,374 | 2/1990 | Van der Woude | 2/453 |
| 4,907,296 | 3/1990 | Blecha | 2/422 X |
| 4,953,963 | 9/1990 | Miller | 359/409 |
| 4,987,608 | 1/1991 | Cobb | 2/453 X |

*Primary Examiner*—Peter Nerbun
*Attorney, Agent, or Firm*—Baker & Botts

[57] ABSTRACT

A headgear mount (10) for night vision goggles (12) is disclosed. The headgear mount (10) is formed with a goggle mounting structure (14) secured to a mounting block (16). Mounting block (16) is secured to frame (22) that is secured to the front portion of the user's cranium by straps (28, 32, 38, 52, 54). Goggle mounting structure (14) allows the goggles (12) to rotate between a line-of-sight position when in use and a stowed position when not in use. A magnet means formed by two magnet positioners (72, 74) and two magnets (74, 76) adjust the power switch of goggles (12) so that the goggles (12) receive power in the line-of-sight position and do not receive power when in the stowed position. Headgear mount (10) has adapters (98, 104) that allow headgear mount (10) to be used with various types of night vision goggles.

17 Claims, 3 Drawing Sheets

5,469,578

NIGHT VISION GOGGLE HEADGEAR MOUNT

RELATED APPLICATION

This application is related to application Ser. No. 08/058, 945 filed and May 7, 1993, entitled "Night Vision Goggle Mount," assigned to the same assignee.

TECHNICAL FIELD OF THE INVENTION

The present invention relates in general to night vision equipment, and more particularly relates to a method and apparatus for mounting night vision equipment on the head of a user.

BACKGROUND OF THE INVENTION

Night vision goggles are standard equipment used by military personnel to facilitate nocturnal activities and activities that occur in places with minimal light. Night vision goggles are generally adapted for amplifying light as it reflects off objects so that objects are observable essentially in the dark. Starlight or light from the moon is sufficient to allow an object to be distinguished from its surroundings. Such a night vision goggle is disclosed in U.S. Pat. No. 4,463,252.

Night vision goggles are frequently worn attached to the user's head by headgear of some type. Attaching the night vision goggles to a headgear allows the user to operate the goggles essentially hands free. Having both hands free assists the user or wearer to carry on other activities while using the goggles.

In the field, a need arises for soldiers and others to remove the night vision goggles to perform certain tasks. In the past, this has usually required physically removing the night vision goggles from a headgear mount, and then when ready to use the goggles again, remounting the goggles. The minimal light in which the night vision goggles are used makes such removal and remounting difficult.

In yet another shorting coming of the prior designs, night vision goggles mounts have frequently been designed to accommodate only one version or type of night vision goggles. This has been a disadvantage because different mounts were required for each type of night vision goggle utilized by a user.

SUMMARY OF THE INVENTION

A need exists for a headgear mount that allows night visions goggles to be stowed out of the way when not in use, but without detaching the goggles, and to easily return the goggles to a position in which they may be used to assist the wearer's vision (line-of-sight). Additionally, a mount is needed that will accommodate the automatic deactivation of power to the night vision goggles immediately when the goggles are placed in a stowed position and will automatically resupply power when the goggles are placed in the line-of-sight position. Finally, a mount is needed that can accommodate different versions or types of night vision goggles while providing the desired features.

In accordance with the present invention, the disadvantages, shortcomings, and problems associated with the previously developed mounts for night vision goggles have been substantially reduced or eliminated by use of the present invention. A headgear mounting system, apparatus, and method are provided with a headgear and a goggle mounting structure that allows the goggles to be stored in a stowed position while being worn, but not used, and rotated to a line-of-sight position when the goggles are being used.

In accordance with another aspect of the invention, the power supply to the goggles is automatically terminated when the goggles are placed in the stowed position and power may be restored when the goggles are placed in the line-of-sight position. (On the PVS-7A goggle, power will automatically be activated; but on the PVS-7B, the ON-OFF switch must be reset to ON before the goggles are reactivated.) This substantially prevents undesired light emissions from the goggles at times when the goggles are not in use.

In accordance with yet another aspect of the present invention, adapters are provided that allow the mount to be used with various versions of night vision goggles.

BRIEF DESCRIPTION OF THE DRAWING

For a more complete understanding of the present invention and the advantages thereof, reference is now made to the following descriptions taken in conjunction with the accompanying drawings, in which:

FIG. 6 is a perspective view of one aspect of the present invention showing a magnet used in the present invention;

DETAILED DESCRIPTION OF THE INVENTION

An embodiment of the present invention and its advantages are best understood by referring to FIGS. 1 through 6 of the drawings, like numerals being used for like and corresponding parts of the various drawings.

Figure 1:
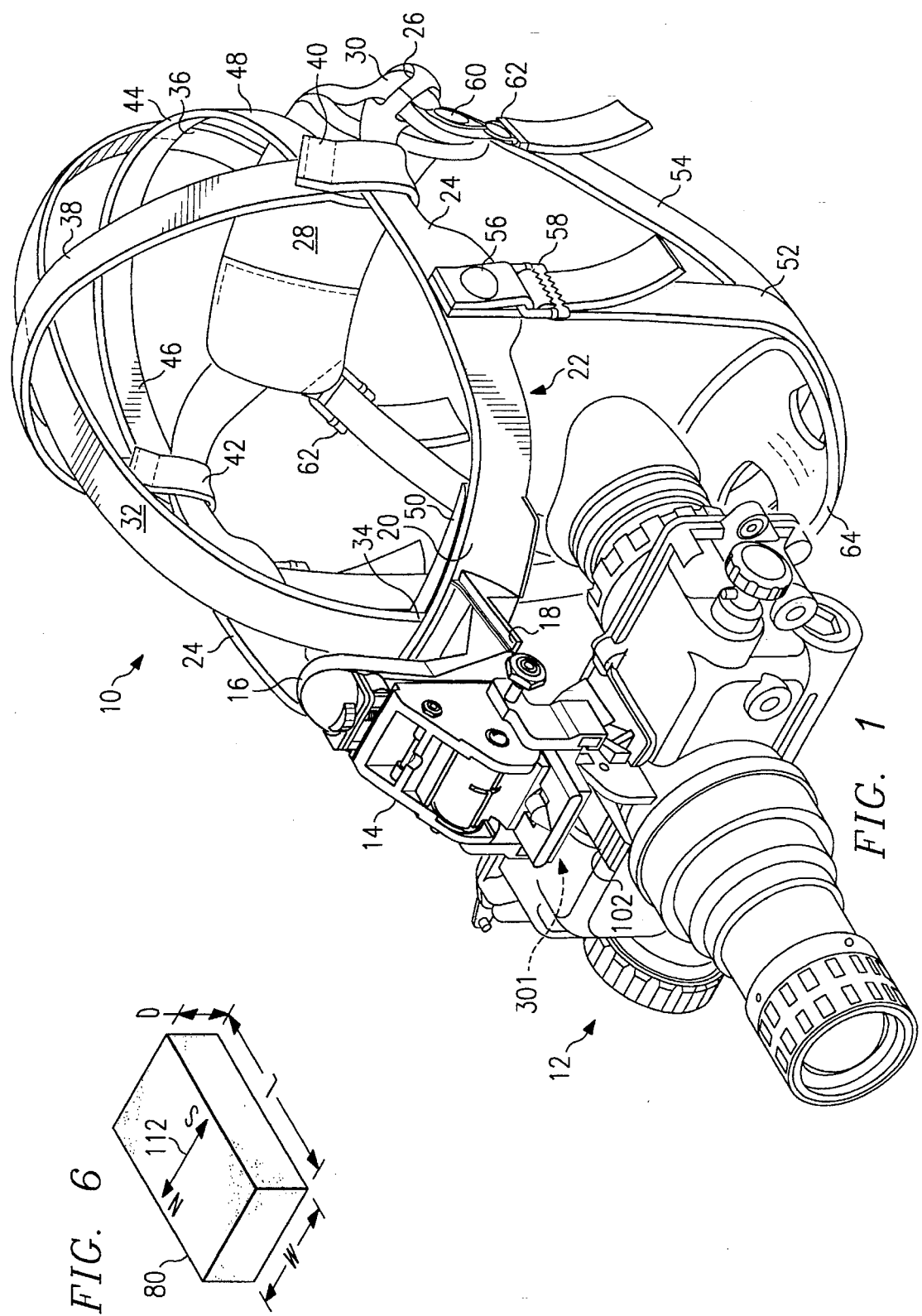
FIG. 1 is a perspective view of the present invention showing night vision goggles attached thereto.

Referring now to the drawings, and more particularly to FIG. 1, there is shown a head gearmount, generally designated 10, which incorporates an embodiment of the present invention. Night vision goggles 12, e.g., AN/PVS-7B or AN/PVS-7A, are attached to a goggle mounting structure 14. Goggle mounting structure 14 is attached to a mounting block 16. Mounting block 16 is secured to a mounting shelf 18. Mounting shelf 18 is secured to a base part 20 of a cranial frame 22. Cranial frame 22 is formed of base part 20 and a first and a second temporal strip 24. Temporal strips 24 have slots 26. When worn, cranial frame 22 is positioned proximate the frontal tuber and temporal regions of the wearer's cranium. A pad 28 is secured to cranial frame 22 by fastening straps 30 in conjunction with slots 26.

When worn, crown strap 32 is disposed about the vertex of the wearer's skull. Crown strap 32 has a first and a second end 34 and 36. First end 34 of crown strip 32 is secured to base part 20 of cranial frame 22. Second end 36 of crown strap 32 is secured to pad 28. When worn, a radial strap 38 is also disposed across the vertex region of the wearer's skull. Radial strap 38 has a first looped end 40 and a second looped end 42. Looped ends 40 and 42 are loosely attached to temporal strips 24. A posterior girth strap 44 has a first end 46 and a second end 48. First end 46 of posterior girth strap 44 is attached to second looped end 42 of radial strap 38. Second end 48 of posterior girth strap 44 is secured to first looped end 40 of radial strap 38. Posterior girth strap 44 is positioned proximate the posterior pole region of the wearer's cranium when worn. Crown strap 32, radial strap 38, cranial frame 22, posterior girth strap 44, pad 28 and a padding material 50, which is secured to cranial frame 22, form the upper portion of head gear mount 10.

A chin strap 52 and a lower girth strap 54 provide a downward force when necessary on the upper portion of head gear mount 10. Chin strap 52 is secured to cranial frame 22 proximate the beginning region of temporal strip 24 and is secured with a swivel snap 56. A buckle 58 allows chin strap 52 to be adjusted in terms of length. Lower girth strap 54 is secured to fastening straps 30 with a swivel snap 60. The length of lower girth strap 54 may be adjusted with buckles 62. In the area where chin strap 52 and lower girth strap 54 pass under the mandible of the wearer, a chin cup 64 is attached to chin strap 52 and lower girth strap 54. Thus, a plurality of straps 30, 32, 38, 44, 52, and 54 hold the cranial frame 22 to the wearer's cranium.

Figure 2:
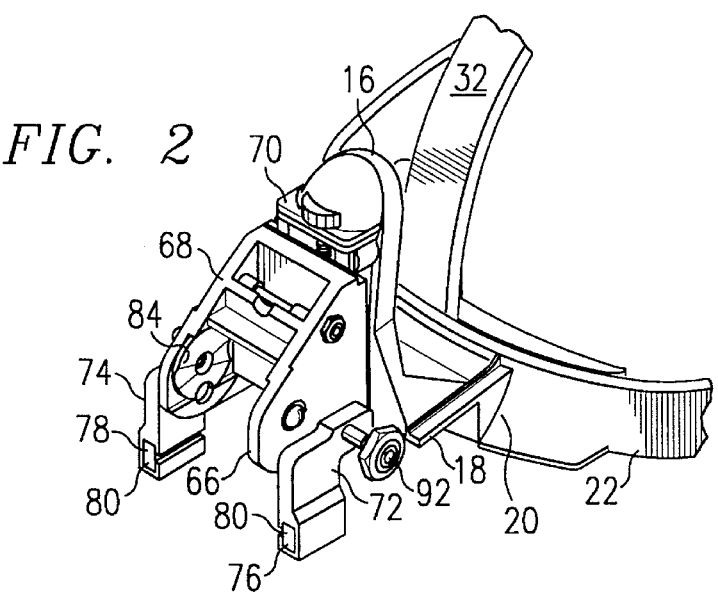
FIG. 2 is a perspective view of one aspect of the present invention showing the goggle mounting structure.

Referring to FIG. 2, there is shown a goggle mount 66 and mounting block 16. Goggle mount 66 is based on a standard goggle mount to be used with an ANVIS night vision goggle system. Goggle mount 66 has frame 68 that is attached to a vertical adjustor 70, which allows for adjustment of the vertical height of the night vision goggles 12 relative to the wearer's eyes so that goggles 12 may be placed in the line of sight of the user (line-of-sight position). Goggle mounting structure 14 may be formed by goggle mount 66, vertical adjustor 70, and mounting block 16.

Magnet mounts or positioners 72 and 74 are attached to the sides of frame 68. The lower portions of magnet positioners 72 and 74 hold magnets means. Magnets means may be magnets 76 and 78. The north poles for magnets 76 and 78 are indicated by reference numeral 80. Magnet 76, which is attached to magnet positioner 72, is positioned with its magnetic north pole at the uppermost vertical portion of magnet 76 as attached. Magnet 78, which is attached to magnet positioner 74, is positioned with its magnetic north pole at the lowest portion of magnet as attached. Magnets 76 and 78 are described in more detail in conjunction with the discussion of FIG. 6 below.

Figure 4:
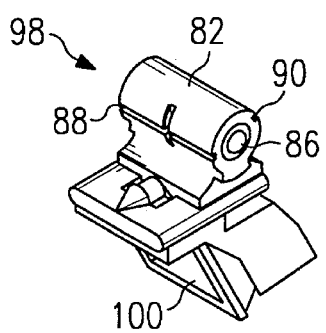
FIG. 4 is a perspective view of one aspect of the present invention showing the AN/PVS-7B adapter.
Figure 5:
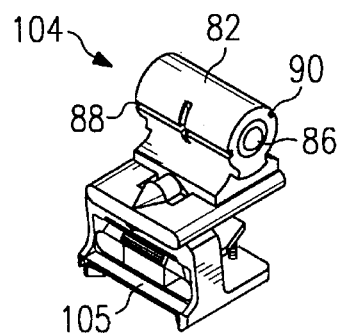
FIG. 5 is a perspective view of one aspect of the present invention showing the AN/PVS-7A adapter.

Goggle mount 66 is designed to receive an ANVIS ball-and-socket insert 82 (see FIGS. 4 and 5). Goggle mount 66 has sockets 84 which are designed to receive and hold outwardly forced balls 86. Ball-and-socket insert 82 is allowed to rotate between two positions. The two positions are determined by grooves 88 and 90 in ball-and-socket insert 82. A release lever 92 permits the ball-and-socket insert 82 to rotate between the two grooves 88 and 90. The two positions defined by grooves 88 and 90 correspond to the line-of-sight position and the stowed position. In the line-of-sight position, the goggles 12 are in the line of sight of the user and may be used to enhance the wearer's vision. The stowed position allows the goggles 12 to be out of the line of sight of the user, and out of the way, but they may be quickly and easily returned to the line-of-sight position by depressing release button 92 and rotating or flipping the goggles downwardly. Other embodiments could include additional positions.

Figure 3:
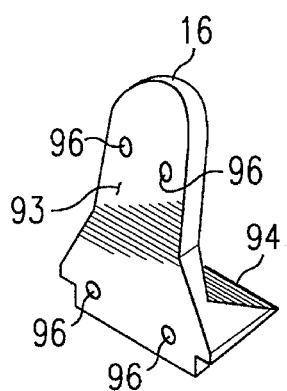
FIG. 3 is a perspective view of one aspect of the present invention showing the mounting block.

Referring now to FIGS. 2 and 3, there is shown mounting block 16. A back surface of vertical adjustor 70 is secured to mounting block 16 on mounting block face 93. Mounting block 16 is secured to mounting shelf 18. Mounting shelf 18 is secured to base part 20 of cranial frame 22. In another embodiment, mounting block 16, mounting shelf 18 and cranial frame 22 may be formed of one integral piece. Mounting block face 93 is shaped to approximate the back surface of vertical adjustor 70 and is formed to have apertures 96 that facilitate attachment of goggle mount 66 to mounting block 16. Mounting block 16 has base portion 94 that is formed to fit securely on mounting shelf 18. Mounting block 16 can be secured to shelf 18 by adhesive, glue or fasteners. In other embodiments of the present invention, mounting block 16 and mounting block 18 may be formed of one integral piece.

Figure 7:
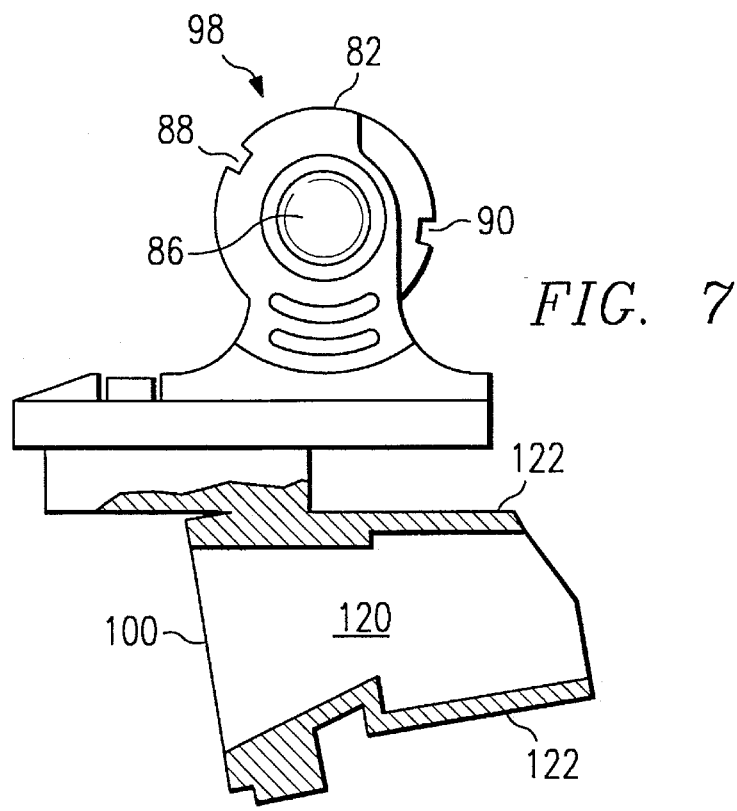
FIG. 7 is a partial cutaway cross-sectional view of one aspect of the invention showing the AN/PVS-7B adapter.

Referring now to FIG. 4, there is shown one aspect of the present invention that allows the head gear mount to be used with AN/PVS-7B night vision goggles. This aspect of the present invention may be referred to generally as a 7B adapter 98. The upper portion of the 7B adapter 98 is a standard ANVIS ball-and-socket insert. As previously described, outwardly forced balls 86 engage sockets 84 and thereby secure the adapter into the goggle mount 66. Grooves 88 and 90 allow adapter 98, and the goggles 12 since they are attached to adapter 98, to rotate between two positions. The two positions correspond to the line-of-sight position and the stowed position. Adapter 98 has a receptacle 100 formed in the lower portion or bottom surface of the adapter 98 to receive and hold a tapered stud on the night vision goggles 12. A partial cutaway cross-sectional view of adapter 82 is shown in FIG. 7. Receptacle 100 has a hollow section 120 which is formed by walls 122. The tapered stud is released from receptacle 100 when release 102 is depressed (see FIG. 1). Thus, adapter 98 allows the 7B goggles 12 to be used with the head gear mount 10. An adapter 104 designed to be used with the AN/PVS-7A goggle may be used on the same head gear mount 10.

Figure 8:
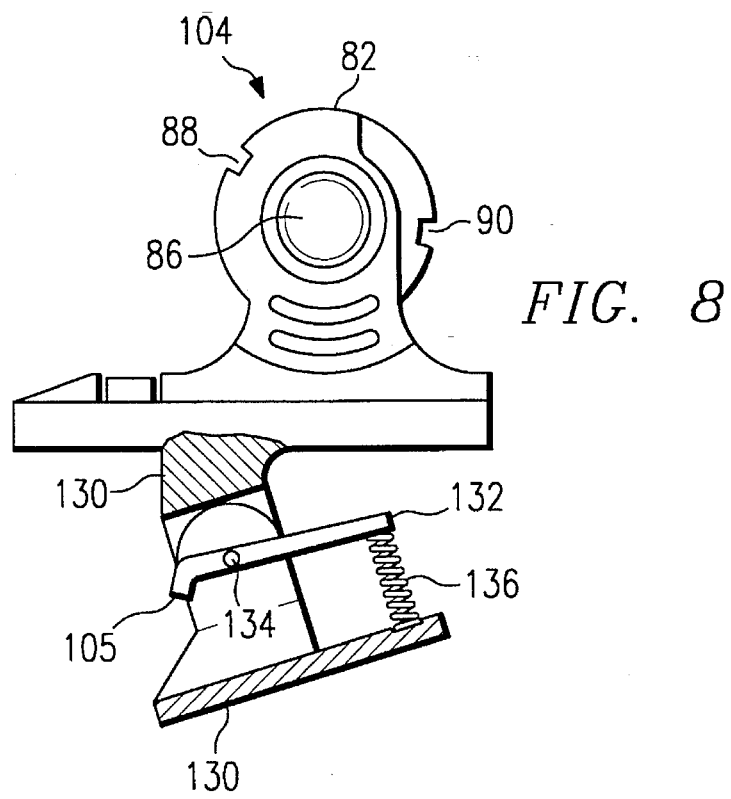
FIG. 8 is a partial cutaway cross-sectional view of one aspect of the invention showing the AN/PVS-7A adapter.

Referring now to FIG. 5, there is shown adapter 104 for use with the AN/PVS-7A night vision goggle. As previously discussed, adapter 104 has two grooves 88 and 90, which define two positions in which night vision goggles 12 may be placed. Ball-and-socket insert 82 of adapter 104 engages sockets 84 in goggle mount 66, and thereby secures to the head gear mount 10. The upper portion of adapter 104 is a standard ANVIS ball-and-socket insert. The lower portion of adapter 104 has been formed to receive a tapered stud on the 7A goggles 12 in receptacle mount 105. A partial cutaway cross-sectional view of adapter 104 is shown in FIG. 8. Receptacle 105 is formed by walls 130. Walls 130 form a cavity for receiving a tapered stud on the goggles 12. Disposed across the top of the cavity is releasing plate or lever 132, which pivots about a pin 134. Release 132 is biased by spring 136. Like the 7B adapter 98, the 7A adapter 104 allows the goggle mount 66 to hold the 7A goggles until a release, such as 92, is depressed.

Referring now to FIG. 6, there is shown a magnet which may be magnet 78 or 80. In the preferred embodiment, the magnet is made of neodymium-iron-boron (NdFE) and is sized to have a width, W, of 0.375 inches, a length, L, of 0.625 inches, and a depth, D, of 0.187 inches. Line 112 shows the magnetic orientation of magnets 76 and 78. The north poles of magnets 76 and 78 are designated with the numeral 80 (FIG. 2). Magnets 76 and 78 are incorporated in the present invention in order to adjust the power supply to the night vision goggles 12 according to their position.

The AN/PVS-7A and the AN/PVS-7B goggles utilize a magnetic reed switch located opposite to one another (the switches are shown to be the general area of reference numeral 301). The magnetic field produced by magnets 76 and 78 serve to trip the magnetic reed switch of either the 7A or 7B goggles. When goggles 12 are in the line-of-sight position, the magnetic field produced by magnets 76 and 78 cause the magnetic reed switch to be in the closed position, which allows power to be supplied to the goggles. When goggles 12 are in the stowed position, the magnetic field produced by magnets 76 and 78 causes the magnetic reed switch to be in the open position so that power is not supplied to goggles 12. Thus, the power to the night vision goggles 12 is automatically adjusted according to the position of the goggles 12.

Although the present invention and its advantages have been described in detail, it should be understood that various changes, substitutions and alterations can be made therein without departing from the spirit and scope of the invention as defined by the appended claims.

What is claimed is:

1. A system for mounting night vision goggles to a user's cranium, comprising:
   a goggle mounting structure for receiving and holding the night vision goggles, and for placing the goggles in a line-of-sight position and a stowed position without attachment from the mounting structure:
   a helmetless headgear for securing the goggle mounting structure to the user's cranium; and
   magnet means for controlling activation of the goggles in the line-of-sight position and deactivating the goggles in the stowed position.

2. A system for mounting night vision goggles to a user's cranium comprising:
   a goggle mounting structure for receiving and holding the night vision goggles and for placing the goggles in a line-of-sight position and a stowed position without detachment from the mounting structure;
   a helmetless headgear for securing the goggle mounting structure to the user's cranium;
   magnet means for controlling activation of the goggles in the line-of-sight position and deactivating the goggles in the stowed position;
   wherein the magnet means comprises:
      a first magnet secured to a first side of the goggle mount;
      a second magnet secured to a second side of the goggle mount; and
      the first and second magnet operable to cause power to be supplied to the goggles when the goggles are in the line-of-sight position and to terminate the power to the goggles when the goggles are in the stowed position.

3. A system for mounting night vision goggles to a user's cranium, comprising:
   a goggle mounting structure for receiving and holding the night vision goggles, for placing the goggles in a line-of-sight position and a stowed position without detachment from the mounting structure;
   a helmetless headgear for securing the goggle mounting structure to the user's cranium;
   wherein the headgear comprises:
      a cranial frame positioned about the frontal tuber and temporal regions of the user's cranium when worn, and further comprising:
         a base part; and
         a first and a second temporal strip;
      a pad placed about a posterior pole region of the skull when worn;
      a crown strap having a first and a second end, the first end of the crown strip secured to the base part of the cranial frame and the second end of the crown strip secured to the pad;
      a radial strap having a first and second loop end, the first loop end coupled to the first temporal strip and the second loop end coupled to the second temporal strip, the radial strap positioned over the vertex of the user's skull when worn;
      a posterior girth strap coupled to the first and second loop end of the radial strap, the posterior girth strap positioned about the posterior pole region of the skull and just above the pad when worn;
      a chin strap rotatably attached to the cranial frame and positioned about the user's mandible when worn; and
      a lower girth strap coupled to the chin strap and the pad.

4. An apparatus for mounting night vision goggles that have a magnetic reed switch to a user's cranium, comprising:
   a cranial frame;
   a plurality of straps coupled to the cranial frame for holding the cranial frame to a portion of the user's cranium;
   a mounting block secured to the cranial frame;
   a goggle mounting structure secured to the mounting block for receiving and holding the goggles and for placing the goggles in a line-of-sight position and a stowed position without detachment from the mounting structure; and
   a magnet means attached to said goggle mounting structure for controlling power supplied to the goggles according to the position of the goggles.

5. The apparatus of claim 4, wherein the cranial frame comprises a base portion, a first temporal strip, and a second temporal strip formed of an integral strip.

6. The apparatus of claim 3 wherein the plurality of straps coupled to the cranial frame comprises:
   a pad placed about in the region of the posterior pole of the skull when worn;
   a crown strap having a first and a second end, the first end of the crown strap rotatably secured to the cranial frame and the second end rotatably secured to the pad, the crown strap positioned about the vertex of the user's skull when worn;
   a radial strap having a first and second loop end, the first loop end coupled to the first temporal strip and the second loop end coupled to the second temporal strip, the radial strap positioned about the vertex of the user's skull when worn;
   a posterior girth strap coupled to the first and second loop end of the radial strap, the posterior girth positioned proximate the posterior pole region of the skull and just above the pad;
   a chin strap rotatably attached to the cranial frame and positioned proximate the user's mandible when worn; and
   a lower girth strap coupled to the chin strap and the pad.

7. The apparatus of claim 4 further comprising a mounting shelf secured to the cranial frame and secured to the mounting block.

8. The apparatus of claim 4, wherein the magnet means comprises a plurality of magnets secured to the goggle mounting structure and operable to produce a magnetic field that controls a reed switch in the goggles so that power may be supplied to the goggles when the goggles are in a line-of-sight position and power is terminated when the goggles are in a stowed position.

9. The apparatus of claim 4, wherein the magnet means comprises:
   a first magnet positioner secured to the goggle mounting structure;
   a second magnet positioner secured to the goggle mounting structure;
   the first magnet positioner and the second magnet positioner being mirror images of each other about a centerline of the goggle mounting structure;
   a first magnet attached to the first magnet positioner with a magnetic north pole of the first magnet positioned at an upper most vertical portion of the first magnet; and
   a second magnet attached to the second magnet positioner with a magnetic north pole of the second magnet positioned at a lowest vertical portion of the second magnet.

10. The apparatus of claim 9, wherein the first and second magnet have a length of 0.625 inches, a width of 0.375 inches, and a depth of 0.187 inches.

11. The apparatus of claim 9, wherein the first and second magnets are made of neodymium-iron-boron (NdFE).

12. The apparatus of claim 4, further comprising an adapter for allowing the apparatus to be used with an AN/PVS-7A, the adapter comprising:
   an ANVIS ball-and-socket mounting insert; and
   a receptacle mount attached to a bottom surface of the ball-and-socket insert for receiving the AN/PVS-7A goggles.

13. The apparatus of claim 4, further comprising an adapter for allowing the apparatus to be used with an AN/PVS-7B, the adapter comprising:
   an ANVIS ball-and-socket mounting insert; and
   a receptacle mount attached to a bottom surface of the ball-and-socket insert for receiving the AN/PVS-7B goggles.

14. An apparatus for mounting night vision goggles to a user's cranium comprising:
   a mounting structure for holding the night vision goggles and allowing the goggles to be rotated between a line-of-sight position and a stowed position;
   a means for securing the mounting structure to the user's cranium;
   a magnet attached to the mounting structure for controlling activation of the goggles in the line-of-sight position, and to deactivate the goggles when placed in the stowed position; and
   wherein the means for securing the mounting structure comprises:
      a cranial frame, positioned about the frontal tuber and temporal regions of the user's cranium when worn,
      a cranial strap coupled to the cranial frame,
      a radial strap coupled to the cranial frame, and
      a chin strap coupled to the cranial frame.

15. The apparatus of claim 14 further comprising a means for allowing the mounting structure to be used with AN/PVS-7A or AN/PVS-7B goggles.

16. An apparatus for mounting night vision goggles to a user's cranium comprising:
   a cranial frame positioned about the frontal tuber and temporal regions of the user's cranium when worn, and further comprising:
      a base part; and
      a first and a second temporal strip;
   a pad placed about the region of the posterior pole of the skull when worn;
   a crown strap having a first and a second end, the first end of the crown strap secured to the base part of the cranial frame and the second end secured to the pad, the crown strap positioned about the vertex of the user's skull when worn;
   a radial strap having a first and second loop end, the first loop end coupled to the first temporal strip and the second loop end coupled to the second temporal strip, the radial strap positioned about the vertex of the user's skull when worn;
   a posterior girth strap coupled to the first and second loop end of the radial strap, the posterior girth strap positioned about the posterior pole region of the skull and just above the pad when worn;
   a chin strap rotatably attached to the cranial frame and positioned about the user's mandible when worn;
   a lower girth strap coupled to the chin strap and the pad;
   a mounting shelf secured to the base of the cranial frame;
   a mounting block secured to the mounting shelf;
   a goggle mount structure secured to the mounting block for receiving and holding the goggles, the goggle mount structure allowing the goggles to rotate between a line-of-sight position and a stowed position; and
   a magnet means for activating the goggles when the goggles are in the line-of-sight position and deactivating the goggles when the goggles are in the stowed position, comprising:
      a first magnet positioner secured to the goggle mounting structure;
      a second magnet positioner secured to the goggle mounting structure;
      the first magnet positioner and the second magnet positioner being mirror images of each other about a centerline of the goggle mounting structure;
      a first magnet attached to the first magnet positioner with a magnetic north pole of the first magnet positioned at a upper most vertical portion of the first magnet; and
      a second magnet attached to the second magnet positioner with a magnetic north pole of the second magnet positioned at a lowest vertical portion of the second magnet.

17. A method of manufacturing a goggle mount for use with a night vision goggle headgear mount and that allows the user to place the goggles in a plurality of positions while wearing the goggles and that controls activation of the goggles according to whether the goggles are in a line-of-sight position, comprising the steps of:
   providing a standard ANVIS goggle mount;
   modifying the standard ANVIS goggle mount to have a first and a second magnet positioner;
   securing a first magnet to the first magnet positioner with a north pole of the magnet proximate the uppermost vertical portion of the first magnet positioner; and
   securing a second magnet to the second magnet positioner with a north pole of the magnet proximate the lowest vertical portion of the second magnet positioner.

\* \* \* \* \*

UNITED STATES PATENT AND TRADEMARK OFFICE
CERTIFICATE OF CORRECTION

PATENT NO. : 5,469,578
DATED : November 28 1995
INVENTOR(S) : Mattes

It is certified that error appears in the above-identified patent and that said Letters Patent is hereby corrected as shown below:

Other Publication,
Title Page [56], insert -- M982/M983 "New! Litton Model M982/M983/ Night Vision Monocular" brochure, 2 pages. --

Column 3, line 46, after "magnet", insert -- 78 --.

Signed and Sealed this

Second Day of July, 1996

*Attest:*

BRUCE LEHMAN

*Attesting Officer*  *Commissioner of Patents and Trademarks*